US010652983B2

(12) United States Patent
Hopkins et al.

(10) Patent No.: US 10,652,983 B2
(45) Date of Patent: May 12, 2020

(54) CENTRAL MANAGEMENT OF DC ENERGY DEVICES

(71) Applicant: iLLUMA-Drive Inc., Burlington (CA)

(72) Inventors: Derek Hopkins, Burlington (CA); Najeeb Khan, Toronto (CA); Willy Liu, Mississauga (CA); Gary Wagstaffe, Stoney Creek (CA); David Wayne Mackinnon, Niagara Falls (CA); Robert Keane, Kitchener (CA)

(73) Assignee: iLLUMA-Drive Inc., Burlington, Ontario (CA)

( * ) Notice: Subject to any disclaimer, the term of this patent is extended or adjusted under 35 U.S.C. 154(b) by 0 days.

(21) Appl. No.: 16/497,020

(22) PCT Filed: Mar. 23, 2018

(86) PCT No.: PCT/CA2018/050357
§ 371 (c)(1),
(2) Date: Sep. 24, 2019

(87) PCT Pub. No.: WO2018/170606
PCT Pub. Date: Sep. 27, 2018

(65) Prior Publication Data
US 2020/0100335 A1    Mar. 26, 2020

Related U.S. Application Data

(60) Provisional application No. 62/476,377, filed on Mar. 24, 2017.

(51) Int. Cl.
*H05B 45/00* (2020.01)
*H02J 1/14* (2006.01)
*H05B 45/50* (2020.01)
*H02J 13/00* (2006.01)
*H02J 1/00* (2006.01)
(Continued)

(52) U.S. Cl.
CPC ............. *H05B 45/50* (2020.01); *H02J 1/00* (2013.01); *H02J 13/0003* (2013.01); *H05B 45/40* (2020.01); *H05B 47/105* (2020.01); *H05B 47/19* (2020.01)

(58) Field of Classification Search
CPC ........ H05B 37/02; H05B 33/08; H05B 45/00; H05B 45/30; H05B 45/34; H05B 45/345; H05B 45/40; H05B 45/50; H05B 47/00; H05B 47/19; H05B 47/195; H05B 47/21; H05B 47/25; H02J 1/00; H02J 1/14; H02J 3/00; H02J 13/0003; H02J 3/381; H02J 3/383
See application file for complete search history.

(56) References Cited

U.S. PATENT DOCUMENTS 9,960,637 B2 * 5/2018 Sanders ................. H02J 3/381
2013/0049465 A1 * 2/2013 Rozman ................. H02J 1/14
307/35

\* cited by examiner

*Primary Examiner* — Jimmy T Vu
(74) *Attorney, Agent, or Firm* — MacMillan, Sobanski & Todd, LLC

(57) ABSTRACT

A direct current (DC) energy and data providing system to various modules associated with loads, wherein the modules are hot swappable in that the modules may be both installed and removed via a standard interface, without powering down the system to provide a simplified network for the management of a DC energy and data for facilitating both upgrade of the system and integration of the system with external systems associated with control, automation and/or security.

19 Claims, 7 Drawing Sheets

(51) Int. Cl.
*H05B 45/40* (2020.01)
*H05B 47/19* (2020.01)
*H05B 47/105* (2020.01)

US 10,652,983 B2

CENTRAL MANAGEMENT OF DC ENERGY DEVICES

FIELD

The present application relates generally to managing direct current energy devices and, more specifically, to accomplishing such managing through the use of a modular design.

BACKGROUND

It is common practice to control a plurality of loads with a corresponding plurality of switches. That is, a switch may be associated with each load.

BRIEF DESCRIPTION OF THE DRAWINGS

Reference will now be made, by way of example, to the accompanying drawings which show example implementations; and in which.

DETAILED DESCRIPTION

A DC electricity distribution system includes a cabinet unit that serves as a central platform to provide direct current (DC) energy and data to various modules associated with loads. The modules may be "hot swappable," in that the modules may be both installed and removed via a standard interface, without powering down the system. In this manner, the management of a DC energy and data network is simplified, thereby facilitating both integration and upgrade of the system.

According to an aspect of the present disclosure, there is provided a system. The system includes a power supply, a cabinet unit and a plurality of modules configured to control electricity provided to a corresponding plurality of loads. The cabinet unit includes a memory, a processor, an external Interface allowing connection between building automation systems, external sensors and third party lighting networks and an interface configured to allow a connection between the plurality of modules and the cabinet unit to, thereby, allow provision of electricity from the power supply to selectively, under control of the processor, provide electricity from the power supply to the plurality of loads.

According to another aspect of the present disclosure, there is provided a method of self-configuring a direct current power supply module. The method includes increasing a current available to a load, monitoring a measured current drawn by the load, monitoring a measured voltage across the load, estimating a first voltage threshold and a second voltage threshold, wherein the first voltage threshold and the second voltage threshold define limits of a linear relationship between rate of change of the measured current relative to the measured voltage, determining a particular voltage between the first voltage threshold and the second voltage threshold, selecting an optimum current as a measured current associated with the particular voltage and storing an indication of the optimum current.

Other aspects and features of the present disclosure will become apparent to those of ordinary skill in the art upon review of the following description of specific implementations of the disclosure in conjunction with the accompanying figures.

Figure 1:
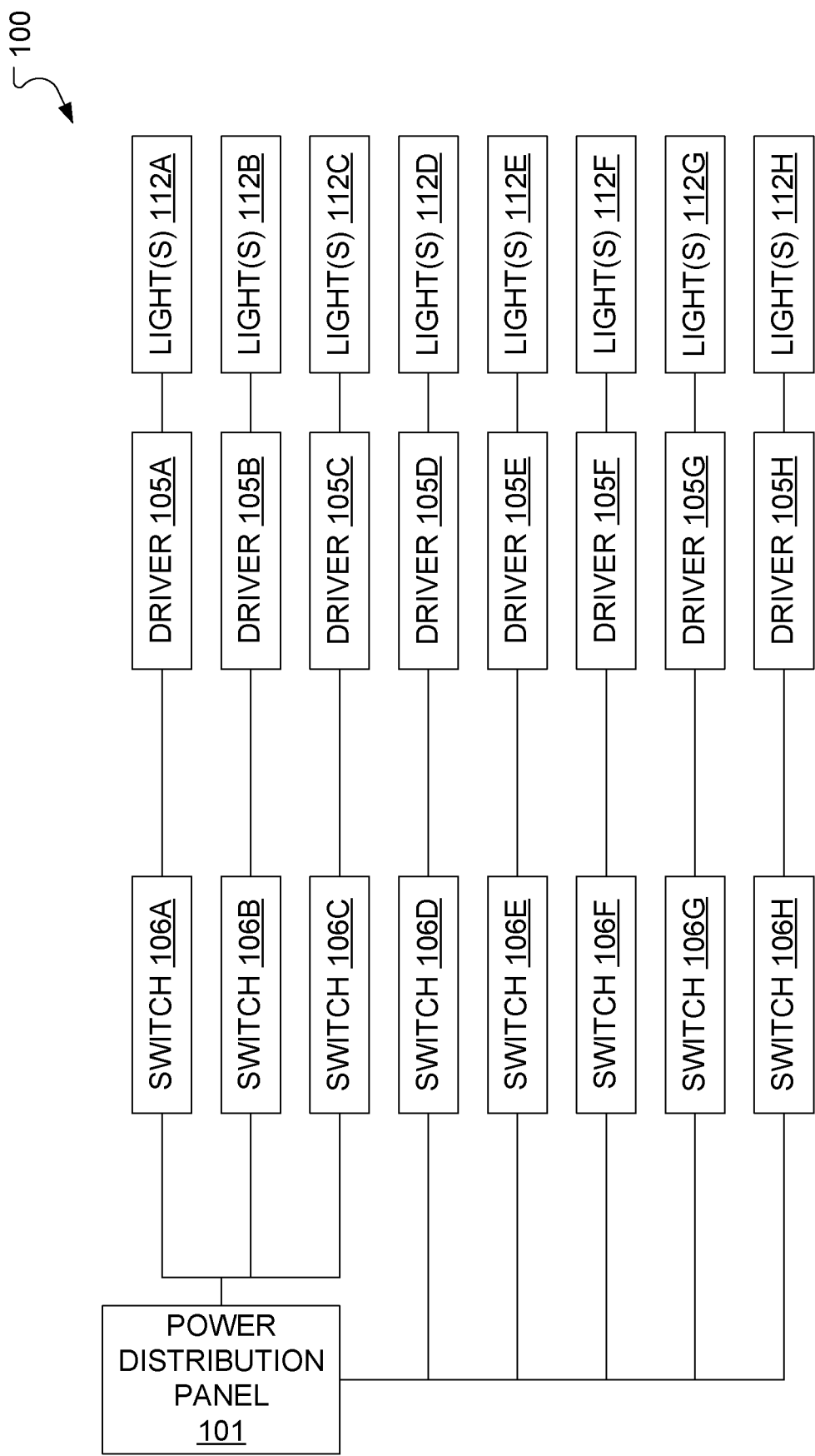
FIG. 1 illustrates a prior art distribution system for low voltage direct current (DC) energy devices.

FIG. 1 illustrates a conventional distribution system 100 for low voltage direct current (DC) energy devices. Example low voltage DC energy devices are illustrated as a plurality of lights 112A, 112B, 112O, 112D, 112E, 112F, 112G, 112H (individually or collectively "112"). As is typical, each of the lights 112 is associated with a corresponding driver 105A, 105B, 105C, 105D, 105E, 105F, 105G, 105H (individually or collectively "105"). In the case where the light 112 is based upon light emitting diode ("LED") technology, the corresponding driver 105 may include a transformer to convert received alternating current (AC) electricity to DC electricity with a voltage and current appropriate to the specific light 112. In the case where the light 112 is based upon fluorescent light technology, the corresponding driver 105 is conventionally known as a "ballast."

While the lights 112 have been referenced individually. That which appears in the figures to be a single light 112 may be representative of many lights wired together in parallel.

In operation, control of the on/off status of each light 112 is provided by a corresponding switch 106A, 106B, 106C, 106D, 106E, 106F, 106G, 106H (individually or collectively "106"). Each switch 106 controls the flow of AC electricity from a power distribution panel 101 to a corresponding driver 105.

Figure 2:
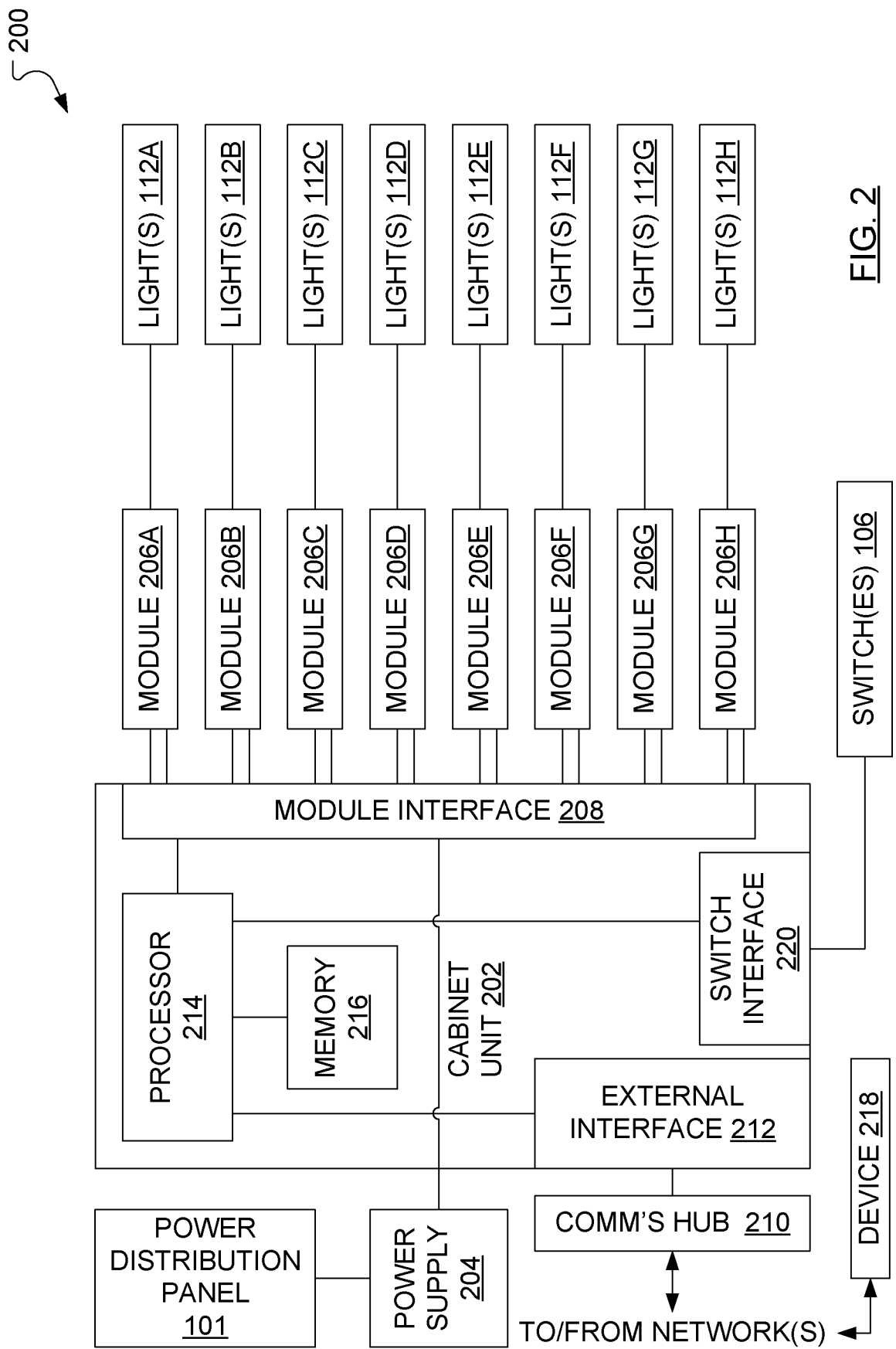
FIG. 2 illustrates a system that involves distribution of low voltage, DC electricity and data via modules in accordance with aspects of the present application.

FIG. 2 illustrates a system 200 that involves distribution of low voltage, DC electricity and data in accordance with aspects of the present application.

The system 200 of FIG. 2 includes a power supply 204, a communications hub 210 and a cabinet unit 202. The cabinet unit 202 includes a cabinet unit processor 214 that communicatively connects to a memory 216, an external interface 212, a switch interface 220 and a module interface 208. The system 200 of FIG. 2 also includes a plurality of lighting modules 206A, 206B, 206C, 206D, 206E, 206F, 206G, 206H (individually or collectively "206") and the plurality of lights 112 familiar from the system 100 of FIG. 1. The lighting modules 206 plug into the cabinet unit 202 via the module interface 208. The system 200 of FIG. 2 may be called a "modular" system due to the use of the lighting modules 206. In dependence upon an operating mode of the associated light 112, each module 206 may be one of a constant current light module, a constant voltage light module or a DC power (DCP) module. The latter of these will be discussed in the context of FIG. 3.

The communications hub 210 may be configured to allow both local area network (LAN) communication and wide area network (WAN) communication. While the connection between the communications hub 210 and the networks is illustrated as a wired connection, it should be clear that the connection may be implemented wirelessly.

The system 200 of FIG. 2 also includes a remote device 218. The remote device 218 may be operable to communicate with the same LAN and/or WAN with which the communications hub 210 may communicate. The remote device 218 may maintain wired or wireless connections to various networks and may be implemented, for a few examples, as: a desktop personal computer; a laptop personal computer; a tablet computer; a smartphone; and a remote control device dedicated to the cabinet unit 202 of FIG. 2.

The switches 106 of FIG. 1 also appear in FIG. 2. However, rather than interposing the power distribution panel 101 and the lights 112, the switches connect to the switch interface 220 of the cabinet unit 202. Notably, even though, for illustration purposes, the switches 106 are shown to have a physical, wired connection to the switch interface, it should be understood that communication between the switch interface 220 and one or more of the switches 106 may be carried out using a wireless communication protocol. Suitable wireless protocols include the known Bluetooth™, Zigbee™, Z-Wave™ and EnOcean™.

While the system 200 of FIG. 2 may appear to be specific to lighting, it should be understood that the cabinet unit may be used to control and receive information from other DC devices.

Figure 3:
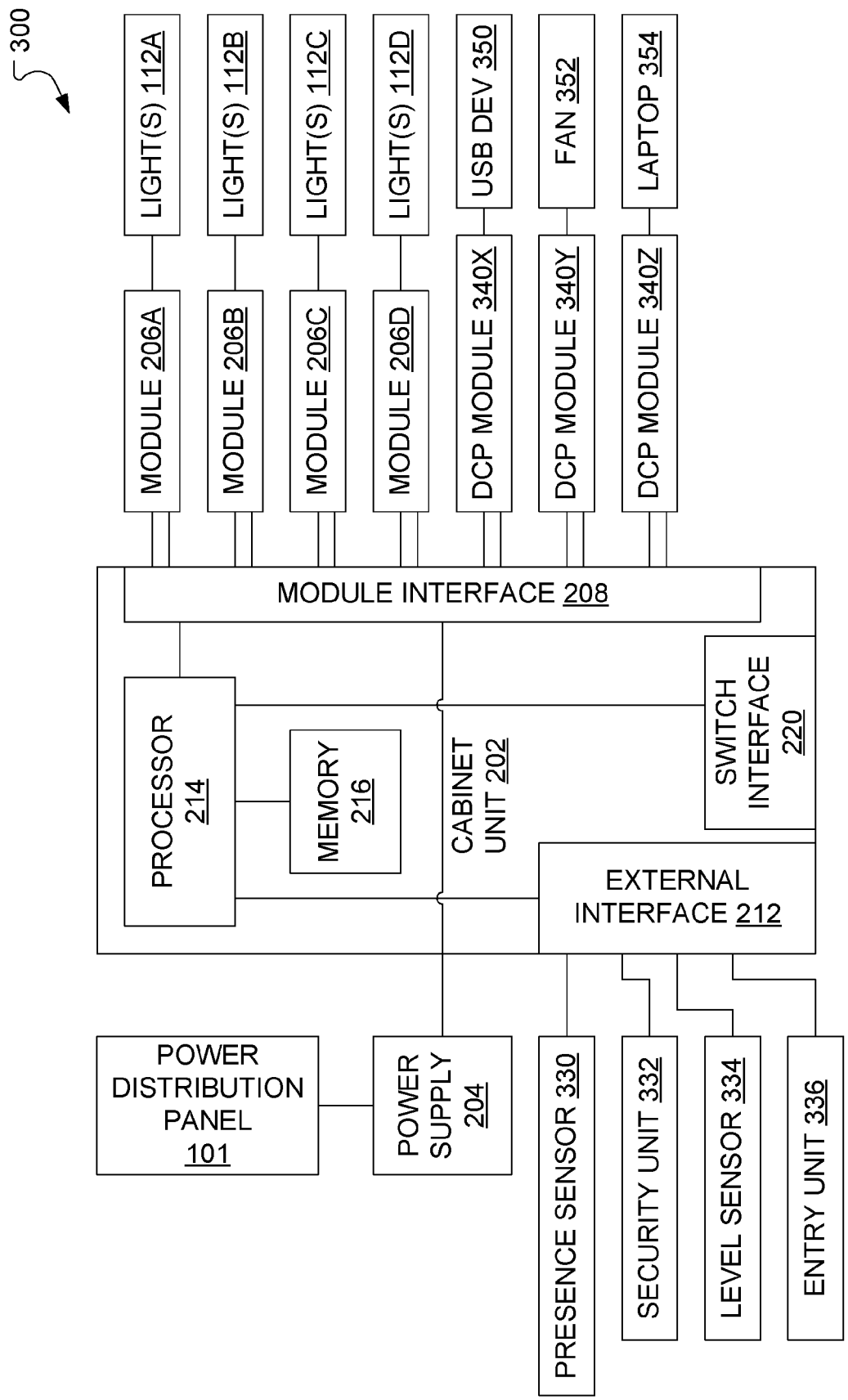
FIG. 3 illustrates a system wherein the system of FIG. 2 is adapted for use with DC devices that are distinct from those associated with lighting.

FIG. 3 illustrates a system 300 wherein the system 200 of FIG. 2 is adapted for use with DC devices that are distinct from those associated with lighting. The system 300 of FIG. 3 includes a presence sensor 330, a security unit 332, a light level sensor 334 and an entry security unit 336, each of these devices being connected to the external interface 212 of the cabinet unit 202. Further DC devices that are distinct from those associated with lighting are also illustrated to include a Universal Serial Bus (USB) device 350, a fan 352 and a laptop computer 354. The USB device 350 is illustrated as connecting to the cabinet unit 202 via a first DCP module 340X. The fan 352 is illustrated as connecting to the cabinet unit 202 via a second DCP module 340Y. The laptop computer 354 is illustrated as connecting to the cabinet unit 202 via a third DCP module 340Z. The first DCP module 340X, the second DCP module 340Y and the third DCP module 340Z may be referenced herein collectively or individually using reference number 340. Of course, other DC devices may be connected, such as various electronics, cellular telephones and appliances.

Figure 4:
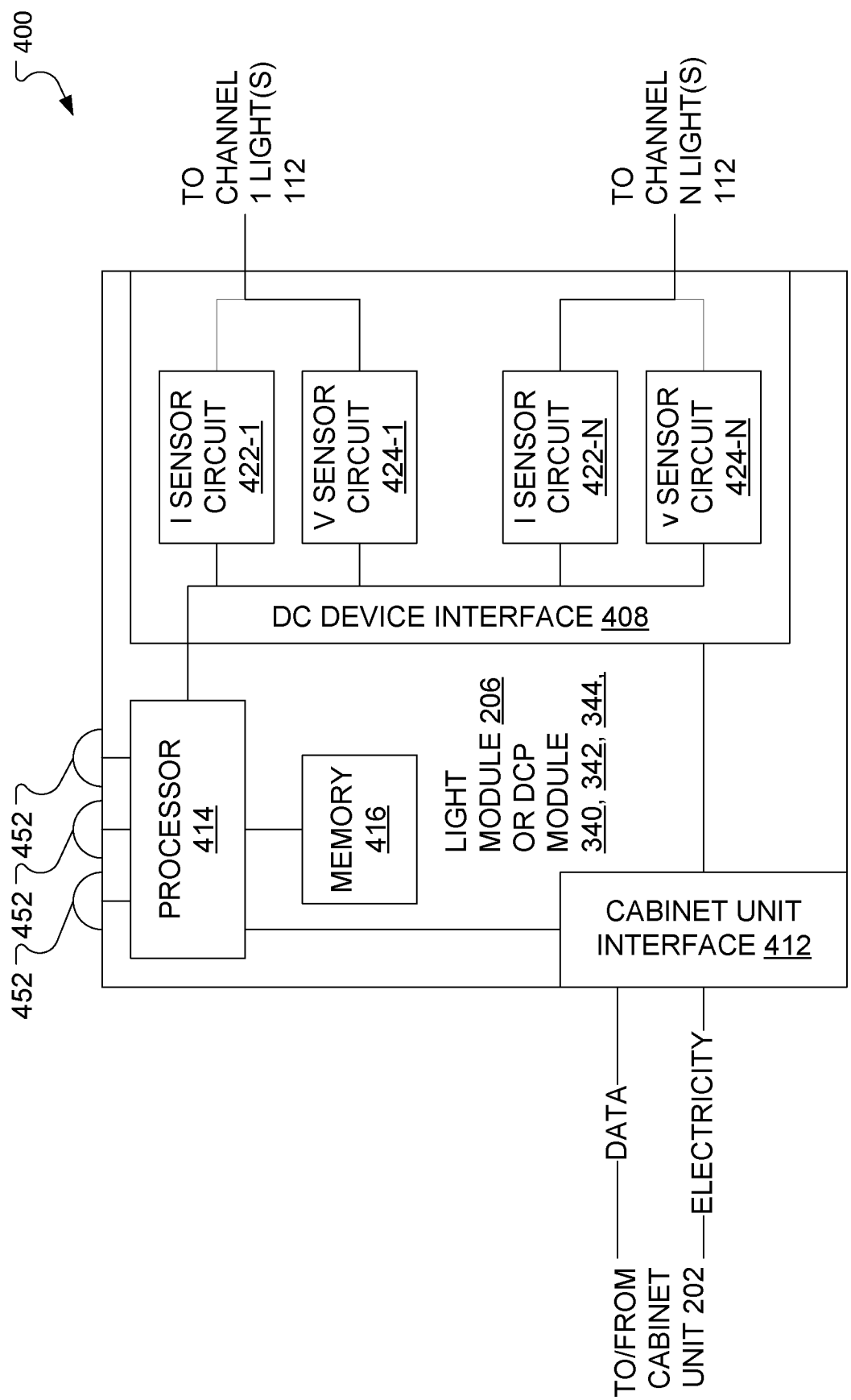
FIG. 4 illustrates one of the modules of FIG. 2 in accordance with aspects of the present application.

FIG. 4 illustrates, in more detail, an example one of the modules 206. The module 206 includes a module processor 414 in communication with a module memory 416, a cabinet unit interface 412 and a DC device interface 408. The DC device interface 408 may connect to associated lights by way of a plurality of channels. Connections for two of N channels are illustrated with the understanding that the module 206 may support a single channel or a plurality of channels, dependent upon configuration. The module processor 414 controls a plurality of indicators 452. In one embodiment of the present application, the indicators may be implemented as light emitting diodes (LEDs). In particular, the LEDs 452 may be RGB LEDs, capable of displaying red, green or blue. The DC device interface 408 includes a current sensor circuit 422 and a voltage sensor circuit 424 for each channel. In particular, the DC device interface 408 is illustrated as including a channel 1 current sensor circuit 422-1 and a channel 1 voltage sensor circuit 424-1. The DC device interface 408 is illustrated as including a channel N current sensor circuit 422-N and a channel N voltage sensor circuit 424-N. The voltage sensor circuit 424 may be implemented as a voltage-divider circuit.

Although, in FIGS. 2 and 3, there appears to be only a single connection between modules 206 and lights 112, there may, in fact and as illustrated in FIG. 4, be a plurality of connections between the module 206 and a corresponding plurality of lights 112.

The modular nature of the system 200 of FIG. 2 and the system 300 of FIG. 3 may be shown to allow flexibility in both the type of load controlled and powered. For one example, through the appropriate selection of module 206, 340, 342, 344, 346, constant current loads may be managed by the cabinet unit 202. For another example, through the appropriate selection of module 206, 340, 342, 344, 346, constant voltage loads may be managed by the cabinet unit 202.

In operation, the module interface 208 may be seen to provide multiple connections between the cabinet unit 202 and the lighting modules 206. These connections may, for one example of operation of the system 200 of FIG. 2, allow for transmission of DC electricity from the cabinet unit 202 to the lighting modules 206. More specifically, the DC electricity is received at the cabinet unit 202 from the power supply 204 and, through control of the module interface 208 by the cabinet unit processor 214, the DC electricity is selectively distributed to the lighting modules 206. The connections between the cabinet unit 202 and the lighting modules 206 may, for another example of operation of the system 200 of FIG. 2, allow for exchange of data between the cabinet unit 202 and the lighting modules 206. More specifically, the exchange of data may be understood to occur between the cabinet unit processor 214 and the lighting modules 206.

The communications hub 210 may be configured to allow for interaction of third party control software executed on the remote device 218 with the operation of the cabinet unit processor 214 of the cabinet unit 202. Such third party control software may include, for example: HomeKit™ from Apple Inc. of Cupertino Calif.; Weave from Google Inc. of Mountain View, Calif.; proprietary security system control software; Heating/Ventilation/Air Conditioning (HVAC) control software; and various building management software suites.

The exchange of data between the cabinet unit processor 214 and the lighting modules 206 may be seen to allow for specific control of the lights 112.

Figure 5:
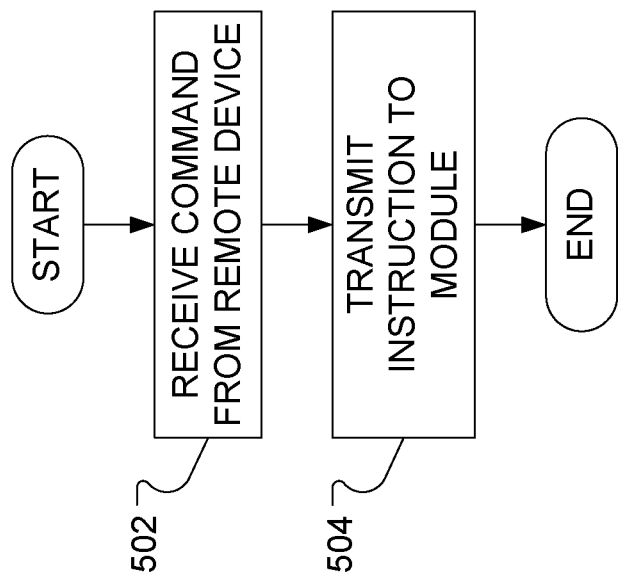
FIG. 5 illustrates example steps in a method of controlling a load.

FIG. 5 illustrates example steps in a method of controlling a load. A user in possession of the remote device 218 may interact with software executed on the remote device 218 to command a specific one of the lights 112 to turn on. A command may be issued from the remote device 218 and communicated to the cabinet unit processor 214 of the cabinet unit 202 via the network and the communication hub 210. Responsive to receiving (step 502) the command, the cabinet unit processor 214 may transmit (step 504) an instruction, via the module interface 208, to the specific module 206 that is associated with the specific light 112. The instruction may, for example, instruct the specific module 206 to allow DC electricity to flow through the specific module 206 to the associated light(s) 112.

At the specific module 206, the instruction may be received at the cabinet unit interface 412 and passed to the module processor 414. The module processor 414 may, under control of software loaded from the module memory 416, control the DC device interface 408 to allow DC electricity, received at the cabinet unit interface 412, to flow through the DC device interface 408 to the associated light(s) 112.

Through the benefit of the switch interface 220 in the cabinet unit 202, rather than using the remote device 218, a user my turn on or off one or more lights 112 using one of the switches 106, even in the absence of specific software. Accordingly, the user may actuate a specific one of the switches 106 and, under control of the cabinet unit 202, one or more lights 112 associated with the specific one of the switches 106 may be switched on.

In addition to simple commands (on or off) that may be sent to a specific one of the module 206, there are also more complex commands that may be sent. In one example of a complex command, actuation of one of the switches 106 could initiate the generation, at the cabinet unit 202, of one or more commands that act to turn on one or more of the lights 112 for a specific duration and then turns off the same lights 112.

In another example of a complex command, an indication of an actuation of one of the switches 106 may be received at the switch interface 220 and passed to the cabinet unit processor 214. In response, the cabinet unit processor 214 may initiate the generation of a command that acts to turn on, to an initial brightness level, one or more of the lights 112 and then fade the brightness of the one or more of the lights 112 from the initial brightness level to full brightness over a configurable duration.

In a further example of a complex command, an indication of an actuation of one of the switches 106 may be received at the switch interface 220 and passed to the cabinet unit processor 214. In response, the cabinet unit processor 214 may initiate the generation of a command that acts to turn on, to an initial brightness level, one or more of the lights 112. The initial brightness level may be dependent upon a light level sensed by the light level sensor 334 (FIG. 3).

In a still further example of a complex command, an indication of an actuation of one of the switches 106 may be received at the switch interface 220 and passed to the cabinet unit processor 214. In response, the cabinet unit processor 214 may initiate the generation of one or more commands that act to execute a defined "scene." A scene may be defined to include several distinct lights in conjunction with specific light levels. In one scene example, all interior lights 112 are off and all exterior lights 112 are on. Accordingly, responsive to receiving an indication that the appropriate one of the switches 106 has been actuated, the cabinet unit processor 214 may transmit "off" commands to modules 206 associated with interior lights 112 and may transmit "on" commands to modules 206 associated with exterior lights 112.

In another scene example, kitchen lights are off, living room lights are on and set to 20% brightness and outdoor lights are off. Accordingly, responsive to receiving an indication that the appropriate one of the switches 106 has been actuated, the cabinet unit processor 214 may transmit "off" commands to modules 206 associated with kitchen lights 112, may transmit "on at 20% brightness" commands to modules 206 associated with living room lights and may transmit "off" commands to modules 206 associated with exterior lights 112.

The communications hub 210 allows for remote notification of the system status. Such remote notification may, for example, be communicated by the cabinet unit processor 214 to a network-connected computer (not shown). The network-connected computer may be configured to act as a so-called "web portal" in that interested parties may employ a world-wide-web browser to connect to the web portal and review the status of the lights 112. The network-connected computer may also handle transmission of remote notifications to a distribution list of interested parties. The network-connected computer may, for example, use the known simple mail transfer protocol (SMTP) or the known short messaging service (SMS) to carry out the transmission of the remote notifications. The interested parties may be include a user of the remote device 218 and other parties lacking the remote device 218. The other parties lacking the remote device 218 may, for example, be notified by email message, using the known Simple Mail Transfer Protocol (SMTP), or may be notified by text message, using the known Short Messaging Service (SMS) protocol over a cellular network.

As facilitated by the design of the module interface 208, all of the lighting modules 206 may be considered to be "hot swappable." Accordingly, the task of upgrading one of the lighting modules 206 or replacing one of the lighting modules 206 requires no downtime of the system 100. In addition, each individual lighting module 206 can provide, to its respective light(s) 112, constant current or constant voltage supply.

Each lighting module 206 may be configured to produce, for example, four channels at 100 watts per channel.

Notably, the channels may be logically grouped. Logical grouping may be used, for example, in conjunction with what may be considered high-powered applications.

Where a specific one of the lights 112 is a constant current LED, the manufacturer typically specifies a particular current to allow the constant current LED to operate.

During attachment, by an installer, of one of the modules 206 to the cabinet unit 202 of FIG. 2, it is expected that the installer will communicate, to the cabinet unit processor 214, a value for the current that is to be drawn by the lights 112 associated with each channel handled by the newly attached module 206.

The installer may, in one aspect of the present application, use a USB flash drive connected to the cabinet unit 202 to program the system, that is, to provide instructions to the cabinet unit processor 214.

The installer may, in another aspect of the present application, use the web portal (not shown) connected the communications hub 210 to program the system, that is, to provide instructions to the cabinet unit processor 214.

Each time the cabinet unit 202 is powered up, or when a new module 206 is hot swapped, this programming is communicated to the module 206 so that the module 206 has a record, for example, stored in the module memory 416, of the quantity of current that is to be supplied to the lights 112 attached to each channel. The per-channel quantity of current may, for example, range between 10 mA and 1800 mA. If the installer is hooking up a light 112 or group of lights 112 that require more current than a single channel can provide then the installer can configure multiple channels to be "bonded" together to provide a combined current level, where the combined current level is higher than one channel itself could provide.

Multiple channels can be combined together. Such combining of channels may also be called "bonding." Indeed, even channels from different modules 206 can be combined together to provide more current for lights 112, or other DC loads, that require more current than a single channel can provide.

Furthermore, various ones of the lighting modules 206 may be logically grouped. In circumstances where power for a particular load (e.g., one of the lights 112) exceeds a power for which a particular one of the lighting modules 206 is configured, more than one of the lighting modules 206 may be used to drive the particular load. Indeed, under appropriate circumstances, the entire output of the cabinet unit 202 may be used to drive a single load. In addition to logical grouping or bonding of channels and modules 206, channels and modules 206 may be physically bonded. Bonded channels may act, logically, as a single channel, so they can be controlled via a single addressable channel. Notably, channels may be bonded across modules 206. Furthermore, channels may be bonded across modules 206 associated with distinct cabinets 202.

Responsive to the module 206 being plugged into the module interface 208 of the cabinet unit 202, the cabinet unit processor 214 may be configured to automatically perform one or more actions.

In one action, the cabinet unit processor 214 may determine whether firmware for the module 206 is up-to-date. Upon determining that the firmware is out-of-date, the cabinet unit processor 214 may act to upgrade the firmware. Accordingly, the cabinet unit processor 214 may ensure that all modules 206 are running the same firmware.

In another action, the cabinet unit processor 214 may transmit, to a given module 206, current levels for each channel associated with the given module 206. The current levels may be based upon programming done at installation.

In a further, ongoing, action, the module processor 414 may monitor the module 206 while the module 206 is operating. Responsive to determining that there are issues with the operation of the module 206, the module processor 414 may report those issues. As illustrated in FIG. 4, each LED 452 among of the LEDs 452 on a given module 206 may be associated with a particular channel among the plurality of channels. To report an issue or an error on a particular channel, the module processor 414 may cause the LED 452 associated with the particular channel to change color (say, from green to red) and/or may cause the LED 452 associated with the particular channel to carry out a particular animation. For example, a particular animation may involve flashing at a specific rate such that a specific error code is represented.

Additionally or alternatively, responsive to determining that there are issues with the operation of the module 206, the cabinet unit processor 214 of the cabinet 202 may report those issues. That is, the cabinet unit processor 214 may transmit an issue-reporting message to the remote device 218 via the external interface 212 and the communications hub 210. The cabinet unit processor 214 may transmit an issue-reporting message to an external party, such as the installer or a contact of a building management group. Indeed, as discussed hereinbefore, the cabinet unit processor 214 may send a message by employing a protocol such as SMTP or SMS.

In a still further, ongoing, action, the cabinet unit processor 214 may log usage data in the memory 216. The usage data may be viewed by a user and by service technicians.

Multiple units like the cabinet unit 202 may be configured to communicate with each other via a connection to a shared bus (not shown). More particularly, the cabinet unit 202 may connect to the shared bus via the of the external interface 212.

The module processor 414 of a given module 206 may be configured to determine, at a regular time interval, whether an active load is connected to the given module 206. By identifying a short-circuited load and controlling the given module 206 to discontinue the supply of electricity to the short-circuited load, the module processor 414 may be seen to reduce the amount of power wasted as a result of a short circuit.

By identifying an open-circuited load and controlling the given module 206 to discontinue the supply of electricity to the open-circuited load, the module processor 414 may be seen to reduce the amount of power wasted as a result of an open circuit.

The system 200 of FIG. 2 may be considered to have utility both in homes and in businesses.

Conveniently, it may be shown that use of a modular system that is based on the module interface 208 is associated with a running cost of a DC energy grid, which running cost may be recognized as being lower than a running cost of an AC energy grid, of which the prior art system 100 of FIG. 1 is an example.

Furthermore, the system 200 of FIG. 2 may be perceived as having reduced complexity, relative to the system 100 of FIG. 1, since the cabinet unit 202 manages all of the lights 112, rather than manual activation of each switch 106 of FIG. 1. Still further, the system 200 of FIG. 2 may be perceived as having lower installation cost, relative to the system 100 of FIG. 1, due to simplified wiring and trunking requirements. Notably, while the cabinet unit 202 does simplify wiring to "wired" devices, the cabinet unit 202 also supports "wireless" switches or devices which require no wiring.

While the cabinet unit 202 has been illustrated, in one example herein, as managing eight of the lighting modules 206, it should be clear that the number of the lighting modules 206 that may be managed by a single cabinet unit 202 is a configurable value and may be dependent upon the power available from the power supply 204 and the extent to which the lights 112 draw power.

Because the power supply 204 is separate from the cabinet unit 202, flexibility of wattage levels is allowed for. Furthermore, the maintenance of the power supply 204 as a unit that is separate from the cabinet unit 202 allows for integration, into the system 200 of FIG. 2, of one or more batteries (not shown) and renewable energy sources (not shown), or a combination of batteries and renewable energy sources. The power supply 204 is illustrated, in FIG. 2, as connected to the power distribution panel 101. It should be clear that the power supply 204 may receive, from the power distribution panel 101, AC power and convert the AC power to DC power for providing to the cabinet unit 202. In the case wherein the power supply 204 is a battery, the power supply need not connect to the power distribution panel 101 and need not convert AC power to DC power.

In a specific example of operation of the system 200 of FIG. 2, the lights 112A may be 10 LEDs, with each LED requiring 100 mA to work correctly. During installation, an electrician programs the cabinet unit processor 214 to instruct the module 206A to provide a channel current level of 1000 mA, that is, the current required by 10 LEDs at 100 mA each. After 6 years, one of the LEDs fails. The module 206A continues to deliver 1000 mA. However, now the nine remaining LEDs installed only require an aggregate of 900 mA. This situation is called overdriving. It is known that overdriving can damage, shorten the life of, or even destroy the remaining LEDs on the channel.

In a similar example, someone may remove one of the LEDs from the channel without reconfiguring the current output from the module 206A. In this case, the light has not failed, but the result is the same; the remaining lights are provided too much current.

A conventional distribution system 100 (see FIG. 1) has a single driver 105 per LED 112. Accordingly, the conventional distribution system 100 would not exhibit overdriving responsive to failure of one LED. If an LED fails, the remaining LEDs would not be affected.

The module processor 414 (see FIG. 4) may monitor, via the current sensor circuit 422 and the voltage sensor circuit 424, the output on each channel and, thereby, detect the failure and reduce the channel current from 1000 mA to 900 mA to, thereby, allow for the failure and, thus, protect the rest of the LEDs from damage. The module processor 414 or the cabinet unit processor 214 can also automatically create a notification, both visually and electronically, that the system 200 of FIG. 2 is in need of maintenance.

Figure 6:
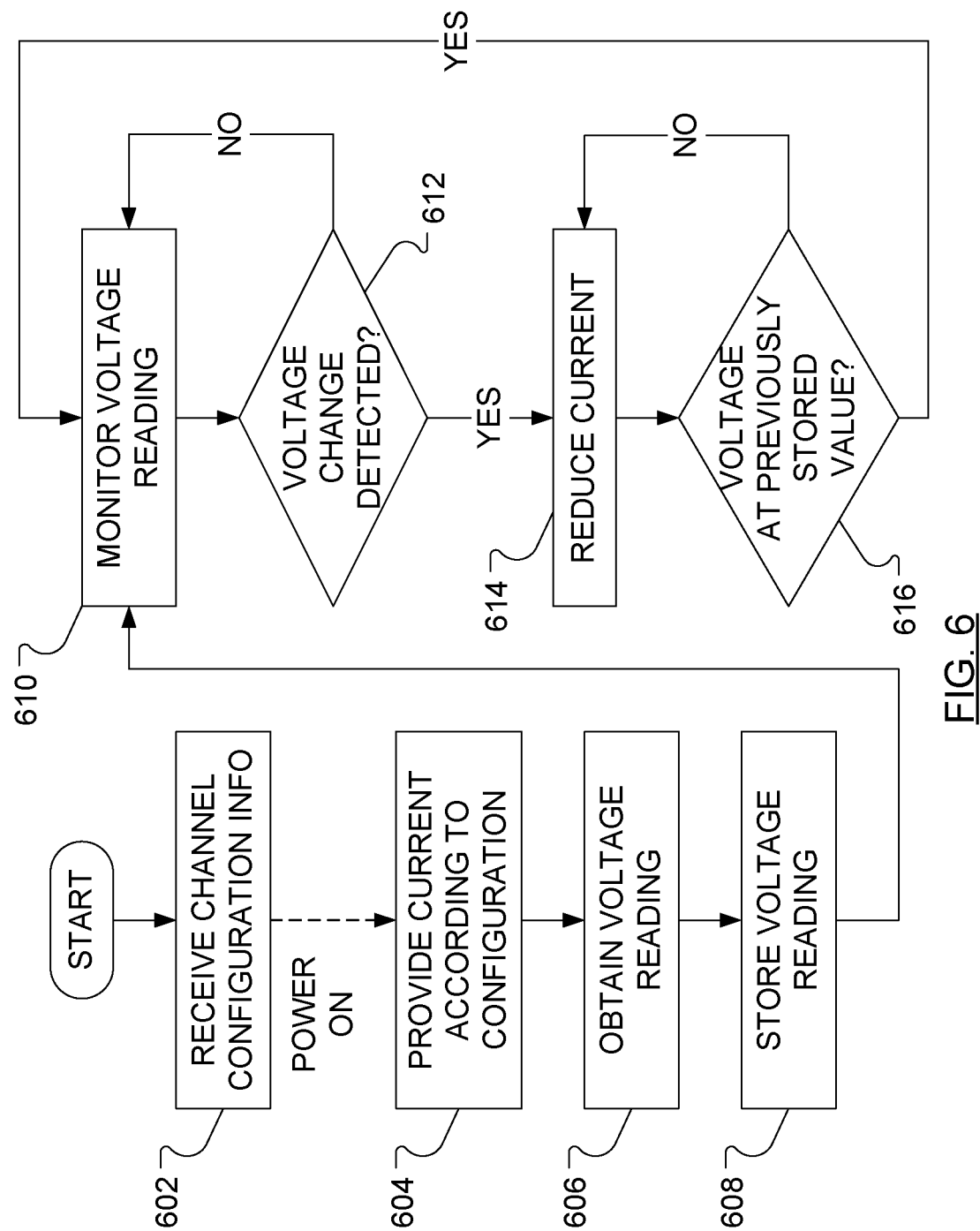
FIG. 6 illustrates example steps in a method of monitoring a channel.

FIG. 6 illustrates example steps in a method of monitoring a channel. The monitoring, by the module processor 414, may involve the following example steps. The module processor 414 receives (step 602) channel configuration information specifying an output current. Later, upon power-on, the module processor 414 controls the DC device interface 408 to provide (step 604) the configured current on the channel. The module processor 414 may then obtain (step 606) a voltage reading from the appropriate voltage sensor circuit 424. The module processor 414 may then store (step 608) the obtained voltage reading in conjunction with the configured current.

During normal operation, the module processor 414 continuously monitors (step 610) the output voltage on the channel to detect (step 612) changes. If failure occurs at an LED, the output voltage on the channel will increase. The module processor 414, upon detecting (step 612) the increase, may react by automatically reducing (step 614) the output current until the output voltage is detected (step 616) to have been reduced to the previously stored value. This will result each LED on the channel receiving the proper amount of current.

In contrast to relying upon a manual configuration for a current allowed on each channel, aspects of the present application allow for the amount of current allowed to be provided to a load connected to a given channel to be determined by the module processor 414, thereby allowing the system to configure itself.

Figure 7:
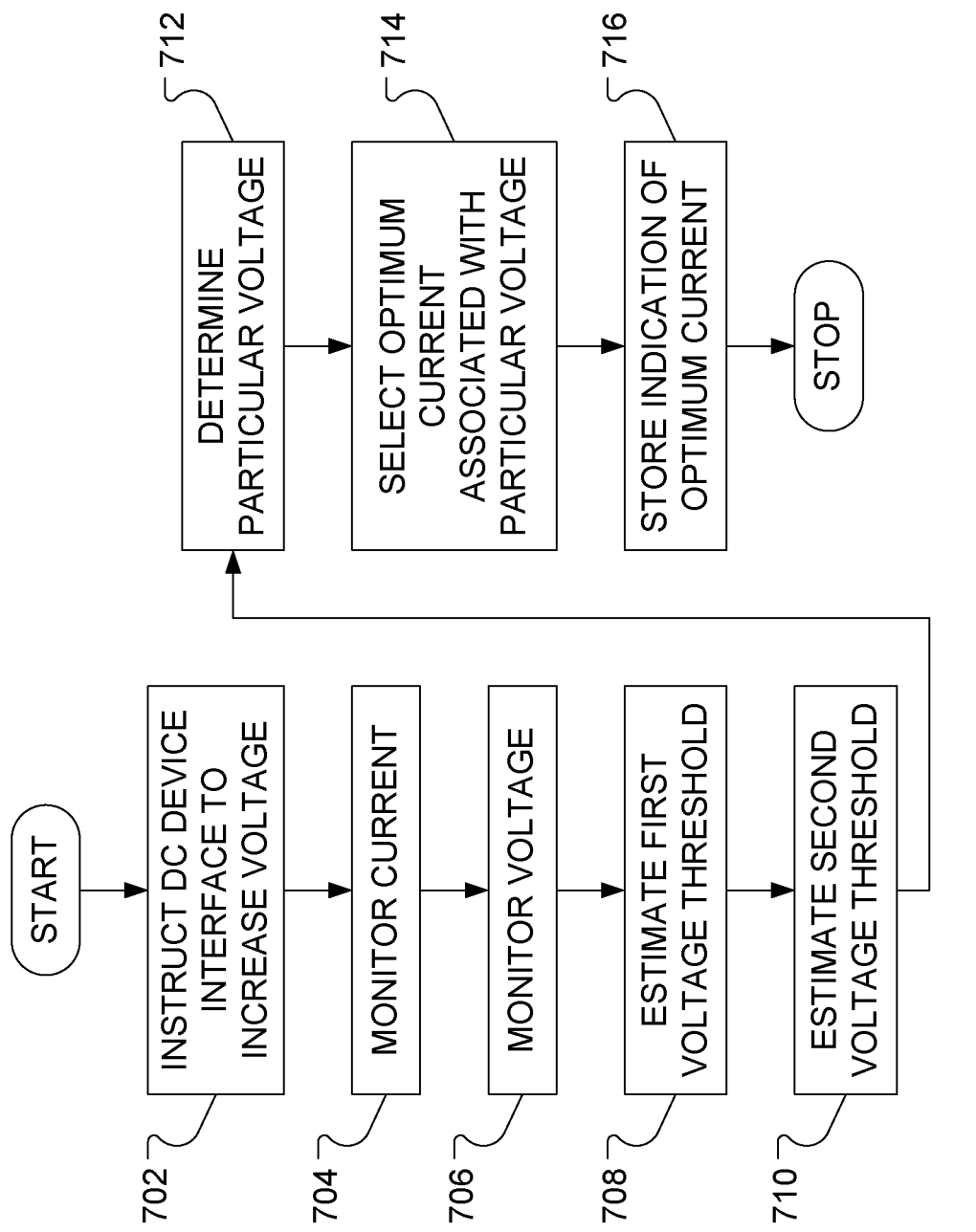
FIG. 7 illustrates example steps in a method of self-configuration.

FIG. 7 illustrates example steps in a method of self-configuration. For a given channel, during an initial power on, the module processor 414 instructs (step 702) the DC device interface 408 to gradually increase the availability of output voltage. The module processor 414 then monitors (step 704) the current output as reported by the current sensor 422 associated with the channel. The module processor 414 also monitors the voltage output as reported by the voltage sensor 424 associated with the channel. The DC device interface 408 continues to gradually increase the availability of output voltage while the module processor 414 monitors the sensed current and voltage. Preferably, the monitoring, by the module processor 414, leads to the determination of an optimum available current for the devices (lights 112 or other DC devices).

It may be shown that while the sensed voltage is below a first voltage threshold, relatively little current flow is sensed. It may also be shown that when the sensed voltage is above a second voltage threshold, sensed current flow tends toward relatively high values. Furthermore, it may be shown that, between the first voltage threshold and the second voltage threshold the relationship be current and voltage is approximately linear.

To determine the optimum available current, the module processor 414 monitors the sensed current and the sensed voltage. Based on the monitored values, the module processor 414 may repetitively determines an instantaneous relationship between a rate of change of the sensed current and a rate of change of the sensed voltage. The determination of the relationship may be seen to allow the module processor 414 to estimate the first voltage threshold and the second voltage threshold.

It may be shown that the optimum available current is associated with a particular voltage that is between the first voltage threshold and the second voltage threshold. Accordingly, once the module processor 414 has estimated the first voltage threshold (step 708) and estimated the second voltage threshold (step 710), the module processor 414 may determine (step 712) the particular voltage and then select (step 714), as the optimum available current, the sensed current associated with the particular voltage. Upon selecting, as the optimum available current, the sensed current associated with the particular voltage, the module processor 414 may store (step 716) an indication of the optimum available current to be used for the load on the channel.

In accordance with aspects of the present application, a candidate voltage for the particular voltage may be determined as being greater than the first voltage threshold by a value that is two-thirds of the difference between the first voltage threshold and the second voltage threshold. In one example, wherein the first voltage threshold is 35 V and the second voltage threshold is 38 V, the particular voltage would be 37 V. The optimum available current may then be selected as the sensed current associated with 37 V.

The above-described implementations of the present application are intended to be examples only. Alterations, modifications and variations may be effected to the particular implementations by those skilled in the art without departing from the scope of the application, which is defined by the claims appended hereto.

What is claimed is:

1. A system comprising:
   a power supply;
   a cabinet unit; and
   a plurality of modules configured to control electricity provided to a corresponding plurality of loads;
   the cabinet unit including:
     a memory;
     a processor;
     an external Interface allowing connection between building automation systems, external sensors and third party lighting networks; and
     an interface configured to allow a connection between the plurality of modules and the cabinet unit to, thereby, allow provision of electricity from the power supply to selectively, under control of the processor, provide electricity from the power supply to the plurality of loads.

2. The system of claim 1 further comprising a communications hub configured to allow bidirectional communication between the processor and a network.

3. The system of claim 2 wherein the network comprises a local area network.

4. The system of claim 2 wherein the network comprises a wide area network.

5. The system of claim 2 wherein the communications hub is external to the cabinet unit.

6. The system of claim 2 wherein the communications hub is internal to the cabinet unit.

7. The system of claim 1 wherein at least one load in the plurality of loads comprises a constant current light emitting diode.

8. The system of claim 1 wherein at least one load in the plurality of loads comprises a constant voltage light emitting diode.

9. The system of claim 1 wherein at least one external sensor among the external sensors comprises a presence sensor.

10. The system of claim 1 wherein at least one external sensor among the external sensors comprises a security unit.

11. The system of claim 1 wherein at least one external sensor among the external sensors comprises a level sensor.

12. The system of claim 1 wherein at least one external sensor among the external sensors comprises a security entry unit.

13. The system of claim 1 wherein a given module among the plurality of modules includes:
- a module processor;
- a module memory;
- a cabinet unit interface; and
- a device interface;

wherein the module processor is configured to:
- instruct the device interface to provide a configured current on a channel;
- store, in the module memory in association with an indication of the configured current, an indication of detected voltage occurring on the channel responsive to provision of the configured current.

14. The system of claim 13 wherein the module processor is further configured to:
- detect a change in the voltage on the channel;
- reduce current provided on the channel until detected voltage has returned to the indication of detected voltage stored in association with the indication of the configured current.

15. The system of claim 1 wherein the power supply comprises an alternating current to direct current converter.

16. The system of claim 1 wherein the power supply comprises a battery.

17. The system of claim 1 wherein a given module among the plurality of modules includes:
- a module processor;
- a module memory;
- a cabinet unit interface; and
- a device interface;

wherein the module processor is configured to:
- instruct the device interface to increase a voltage available to a load among the plurality of loads;
- monitor a measured current drawn by the load;
- monitor a measured voltage across the load;
- estimate a first voltage threshold and a second voltage threshold, wherein the first voltage threshold and the second voltage threshold define limits of a linear relationship between rate of change of the measured current relative to the measured voltage;
- determine a particular voltage between the first voltage threshold and the second voltage threshold;
- select an optimum current as a measured current associated with the particular voltage; and
- store, in the module memory, an indication of the optimum current.

18. A method of self-configuring a direct current power supply module, the method comprising:
- increasing a voltage available to a load;
- monitoring a measured current drawn by the load;
- monitoring a measured voltage across the load;
- estimating a first voltage threshold and a second voltage threshold, wherein the first voltage threshold and the second voltage threshold define limits of a linear relationship between rate of change of the measured current relative to the measured voltage;
- determining a particular voltage between the first voltage threshold and the second voltage threshold;
- selecting an optimum current as a measured current associated with the particular voltage; and
- storing an indication of the optimum current.

19. The method of claim 18 wherein the determining the particular voltage comprises determining a candidate voltage that is greater than the first voltage threshold by a value that is two-thirds of the difference between the first voltage threshold and the second voltage threshold.

* * * * *